United States Patent [19]

Allen, Sr.

[11] 4,433,031
[45] Feb. 21, 1984

[54] PRESERVATION OF WOOD

[75] Inventor: William R. Allen, Sr., Port Murray, N.J.

[73] Assignee: Cherokee Industries, Inc., Hayward, Wis.

[21] Appl. No.: 491,924

[22] Filed: May 5, 1983

Related U.S. Application Data

[62] Division of Ser. No. 295,850, Aug. 24, 1981, Pat. No. 4,399,195.

[51] Int. Cl.$^3$ .................. B27K 3/40; B32B 21/08; C08K 5/13
[52] U.S. Cl. .................. 428/541; 252/404; 427/297; 427/440; 428/529; 523/122; 524/99; 524/341
[58] Field of Search .............. 252/404; 427/297, 440; 428/541, 529; 523/122; 524/99, 341

[56] References Cited

U.S. PATENT DOCUMENTS

| | | | |
|---|---|---|---|
| 1,046,137 | 12/1912 | Aylsworth | 524/341 |
| 1,111,287 | 9/1914 | Aylsworth | 524/341 |
| 2,180,142 | 11/1939 | Fox et al. | 134/78.6 |
| 2,182,080 | 12/1939 | Hatfield | 134/78.6 |
| 2,775,570 | 12/1956 | Barkdoll et al. | 524/341 |
| 3,945,834 | 3/1976 | Clarke et al. | 523/122 |
| 3,968,276 | 7/1976 | Allen | 427/297 |
| 4,041,176 | 8/1977 | Metzner et al. | 424/318 |

*Primary Examiner*—Michael R. Lusignan
*Attorney, Agent, or Firm*—Merchant, Gould, Smith, Edell, Welter & Schmidt

[57] ABSTRACT

Wood is preserved with a water-based treating solution containing a halogenated phenol wood preservative such as pentachlorophenol, a phenolic resin prepolymer such as a phenol formaldehyde prepolymer, and a coupling or solubilizing agent for enhancing the water compatibility of the various ingredients. The treatment is carried out by exposing the wood, while submerged in the treating solution, so one or more cycles of reduced pressure (i.e. vacuum) and elevated pressure.

19 Claims, No Drawings

PRESERVATION OF WOOD

This is a division, of application Ser. No. 06/295,850, filed Aug. 24, 1981, now U.S. Pat. No. 4,399,195; patented Aug. 16, 1983.

FIELD OF THE INVENTION

This invention relates to the preservation of wood, and includes the chemical compositions used to treat the wood, the process of treating the wood, and the treated wood that results from the process. The chemical compositions which are described herein are especially well suited for use in the method of U.S. Pat. No. 3,968,276 in which wood to be treated is exposed to a reduced pressure for the purpose of removing moisture and volatiles from the wood, and thereafter impregnating the wood with an aqueous chemical composition.

BACKGROUND OF THE INVENTION

Wood is one of the oldest materials known to man. Its ready availability in most parts of the world, coupled with the ease with which it can be cut and fabricated into useful articles makes it well suited for a variety of applications. However, because wood is a cellulosic material it is susceptible to decay and deterioration over any extended period of time. As a result, numerous methods have been proposed for treating wood to improve its durability, particularly when used under conditions where the wood is exposed to moisture or biological attack.

Applications of wood such as its use in manufacturing railroad ties, utility poles, fence posts, and the like have created substantial incentives for industry to develop effective and commercially practical methods of treating the wood to extend its useful life (i.e. wood preservation). Various techniques of wood preservation have been used including surface coating, surface treating, and pressure penetration of the wood with a variety of chemicals such as creosote, pentachlorophenol, and the like.

For example, halogenated phenols such as pentachlorophenol are often used to treat wooden poles (such as utility poles). When used for this purpose, it is common to dissolve the pentachlorophenol in a hydrocarbon oil, pressure treat the poles, and then evaporate the excess oil. Such a process is relatively expensive, but is justified by the wood preservative properties of the pentachlorophenol. However, the treated poles tend to "bleed" their treating solution into the surrounding soil when the poles are installed in the ground. This draining or leaching effect is more visible on the sunny side of utility poles which drain or bleed faster because the heat from the sun warms the treating solution and reduces its viscosity. In an effort to reduce treating costs, water is sometimes substituted for the hydrocarbon oil, and the pentachlorophenol is used in one of its salt forms to provide water solubility. However, this approach has a number of disadvantages and is less preferred than the oil treatment.

Unfortunately, most of the present treating processes (e.g. those using creosote, various copper and mercury compounds, or pentachlorophenol), even when operated under significant pressure conditions, do not result in deep impregnation of the wood. Thus, the wood being treated with any chemical is typically treated to only a shallow depth and, in the case of logs or poles very often the degree of penetration does not extend throughout all of the soft or sapwood, much less penetrate the heartwood. Except for one known process, none of the known commercial processes for preserving wood by chemical treatment involves penetrating the wood poles or logs more than perhaps a few millimeters into the heartwood. The one known exception is the process of U.S. Pat. No. 3,968,276.

According to U.S. Pat. No. 3,968,276 wood (logs or dimension lumber) is preserved by impregnating the wood with chemicals which penetrate substantially to the core or center of the wood being treated. In the case of logs or poles, this penetration can be deep within the heartwood and may be substantially complete. This is accomplished by enclosing the wood within a chamber, sealing the chamber, evacuating the chamber slowly so that the wood is exposed to a pressure below atmospheric pressure, introducing into the chamber a sufficient amount of an aqueous solution of resin prepolymer to immerse the wood and then maintaining the vacuum over the immersed wood for a period of time both to allow the removal of moisture and volatiles from the wood and to permit the treating solution to enter into the wood. Thereafter, an additional amount of the resin prepolymer solution is introduced into the chamber (if needed) and the pressure on the system is increased to superatmospheric pressure to thereby cause an even deeper penetration of the treating solution into the wood. The vacuum and pressure cycle may be repeated one or more times (e.g. 1 to 30 or more cycles). When the treatment is completed to the desired extent, the treated wood is recovered from the chamber.

The process just described is extremely effective and achieves substantially greater penetration of the wood than other commonly practiced treating processes.

It would be beneficial to industry if common wood preservatives such as pentachlorophenol could be introduced deep within the wood being treated and if the bleeding or leaching of the pentachlorophenol could be reduced.

SUMMARY OF THE INVENTION

The present invention is based on the discovery that one or more known wood preservatives, such as the halogenated phenols, can be introduced deep into the wood being treated and obtain reduced "bleeding" or leaching, by combining the wood preservative with the method of U.S. Pat. No. 3,968,276 by using a special class of treating compositions that are water based or water dilutable which permits the benefits of the aqueous resin prepolymer system of U.S. Pat. No. 3,968,276 to be maintained. Further, it has been discovered that it is possible to accomplish this without encountering any significant amount of "blooming" which is normally associated with the use of aqueous treating solutions of halogenated phenols, such as pentachlorophenol in the treatment of wood. This blooming effect is caused by the fact that the aqueous treating solutions are made from salts of halogenated phenols (such as the salts of pentachlorophenol) because the salts dissolve readily in water. As a result, after the phenate salts have been used to treat wood, there is a tendency for the salts to be redissolved by rain water or ground water and to migrate easily to the surface of the treated wood where they crystallize during the subsequent evaporation of the water.

Briefly described, the present invention involves manufacturing a water dilutable concentrate or a water based treating solution which consists essentially of:

(a) a halogenated phenol wood preservative such as pentachlorophenol;
(b) a phenolic resin prepolymer such as a phenol formaldehyde prepolymer;
(c) a coupling or solubilizing agent for enhancing the water compatibilty of the concentrate (e.g. methyl alcohol or acetone with or without the addition of a surfactant); and
(d) water.

Optionally and preferably, the treating solutions will also contain organo/metallic salts, especially copper or zinc salts.

In addition, it has been discovered that the ability of the prepolymer to cure rapidly and lock in the halogenated phenol deep within the wood can be enhanced by heating the wood at the conclusion of the treatment (e.g. heating the wood with steam) to thereby accelerate the curing of the resin prepolymer.

DETAILED DISCUSSION

The present invention concerns water based solutions for treating wood and the use of such solutions to treat wood (both dried wood and green wood), and the resulting treated wood products. For convenience, it is sometimes convenient to make the treating solutions in two steps, the first step being the preparation of water-dilutable concentrate or syrup, and the second step consisting of diluting the concentrate with water to achieve a desired concentration of active ingredients. Although any distinction between the concentrate and the aqueous treating solutions, per se, is to a certain extent arbitrary, the treating solutions will normally contain from 1–40% (e.g. 2–30%) by weight of the combined amount of the halogenated phenol wood preservative and a phenolic resin prepolymer, more usually about 5–25% on the same basis. By comparison, the water dilutable concentrates will usually contain from 10–65% by weight of the combined amount of halogenated phenol wood preservative and phenolic resin prepolymer, usually within the range of 15–50% on the same basis. Of course, the use solutions may be prepared directly.

The ingredients which are used in preparing the aqueous treating solutions of the present invention and the corresponding water dilutable concentrates are as follows.

The first essential ingredient is a halogenated phenol wood preservative. Typically, the halogenated phenol wood preservative will be a chlorinated phenol. Pentachlorophenol is preferred. Commercial grade pentachlorophenol (which contains related compounds such as tetrachlorophenol) is particularly useful. These halogenated phenol wood preservatives will ordinarily be used in their phenol form and not as a salt as is conventionally done in the case of treating wood with pentachlorophenol where the phenol is used as the phenate salt because it dissolves readily in inexpensive polar solvents such as water.

The resin prepolymer used in the present compositions will be a water compatible phenolic resin prepolymer, preferably a water based phenol formaldehyde prepolymer. Water soluble or dispersible phenolic resin prepolymers are well known and their preparation, per se, forms no part of this invention. However, all phenolic resin prepolymers do not work with equal effectiveness, and the aqueous phenolformaldehyde prepolymers are preferred. Low viscosity prepolymers are preferred for ease of use. Such prepolymers typically have molecular weights (weight average) of less than 1000 (e.g. 80 to 500).

Although the ratio of halogenated phenol wood preservative to phenolic resin prepolymer will vary depending upon a variety of factors including the particular ingredients being used, the purpose of the wood treatment, the type of wood being treated, etc., in general the weight ratio of halogenated phenol to resin prepolymer will be within the range of from 3:1 to 1:15, and more preferably within the range of 1:2 to 1:10.

The treating compositions of the present invention (as well as the concentrates) will also contain a coupling agent or solubilizing agent for enhancing the water compatibility of the mixture of halogenated phenol and resin prepolymer. This coupling agent will typically comprise a polar co-solvent such as alcohols and ketones. Alcohols such as $C_1$–$C_4$ alkanols (e.g. methyl alcohol) are preferred, with or without added surfactants (e.g. surfactants of the polyethoxy type). The amount of surfactant will usually be 0 to 5 weight-% (e.g. 0.1 to 3 weight-%), based on the total composition weight. The amount of coupling agent used will depend on the coupling agent that is used and the amount of halognated phenol present.

The treating compositions of the present invention (as well as the concentrates) will also contain water as an essential ingredient. In the dilute or use solutions, the water content will generally be at least 50% by weight of the treating solution, usually 55–95% by weight (e.g. 60–75% by weight). In the case of the concentrates, water will normally be present in amounts of 50% by weight or more of the weight of the coupling agent (e.g. methanol with or without added surfactants).

If desired, the treating compositions of the present invention and the concentrates may contain other ingredients such as fire retardant chemicals, dyes or colorants, catalysts, various biocides, and other chemicals (e.g. borax which serves as a buffer or stabilizer). The presence of other wood preservatives such as the organo-metallic compounds is optional but preferred. Compounds of zinc and copper are particularly desirable. Suitable organo/metallic compounds include zinc naphthenate, copper naphthenate and copper-8-quinolinolate.

To prepare the treating compositions of the present invention (and the concentrates), the preferred procedure is to dissolve the halogenated phenol (e.g. pentachlorophenol) in the alcohol, or other coupling agent, and then slowly adding to the resulting mixture an aqueous resin prepolymer, (usually with vigorous agitation), then adding the surfactant (if one is used), then the metallic compounds (if any), and then finally adding such additional water as may be appropriate, noting that the total amount of water to be added will vary depending upon the desired strength of the final product and depending upon whether or not one is interested in producing only a concentrate for convenient shipment to a distant point of usage or whether one wishes to prepare the final composition at its desired level of use.

Optional ingredients can be added at any convenient point. If desired, the addition of the various ingredients can be done simultaneously, sequentially, or incrementally. However, the general procedure as just outlined is preferred, i.e. addition of the halogenated phenol to the alcohol or other coupling agent, followed by addition of the resin prepolymer and subsequent dilution with water. Borax and other buffers can be added last.

In treating wood, the compositions of the type just described will be prepared at an appropriate solids content level (.e. the appropriate level of dilution) and used according to the following general steps:

1. Wood to be treated is selected for treatment. The wood will be debarked and usually precut (e.g. dimension lumber) or preshaped (e.g. poles or fence posts). It may be green or air-dried or force-dried and will often be in the form of poles or dimension lumber. The ability to treat green wood (i.e. wood containing a significant amount of natural moisture) is an important advantage of the present process.
2. The wood to be treated is placed in an evacuation zone and exposed to pressures which are below atmospheric pressure (e.g. at a vacuum of at least 20 inches of mercury, preferably at least 26 inches of mercury) for a time sufficient to remove moisture and other volatiles from the wood. Vacuums of at least 28 inches of mercury are preferred. This reduced pressure is usually achieved slowly over a period of from 10 to 120 minutes (e.g. 15 to 60 minutes).
3. The wood is then immersed in or flooded with the treating composition while still under reduced pressure. During this phase of the treating, additional water and volatiles escape from the wood and the treating solution begins to penetrate into the wood.
4. The pressure within the treating chamber or zone is then gradually increased to a level above atmospheric pressure (e.g. often to a level of 25 psig–500 psig, usually 50 to 350 psig) to thereby increase the penetration of the wood by the treating agent. Typically, this step is continued until the treating agent has substantially completely penetrated into the heartwood, although the process could of course be stopped short of that point if a lesser treatment is desired.
5. To further improve and enhance the depth and quality of penetration of the treating solution into the wood, the vacuum and pressure cycle can be repeated as many times as desired (e.g. 2 to 25 or more cycles). When the process is cycled in this fashion, it is helpful if the maximum pressure during each cycle is increased each time by, for example, 10–100 psig above the maximum pressure of the previous cycle (usually a pressure increase of 25% to 100% over the previous pressure). This appears to prevent the rupture and collapse of the wood cells near the surface of the wood.
6. Recovering treated wood from the treating chamber.

Note that the vacuum and pressure phases of the treating cycle should be achieved gradually to avoid destruction of the cell walls of the wood. Thus, while speed is important for commercial purposes (e.g. output and economics), too rapid a change in pressure can be harmful. Consequently, the optimum cycle rates, pressure and vacuum should be determined for each set of operating conditions to be used (e.g. size, shape and type of wood to be treated; composition of the treating compositions; temperature; etc.).

Since it is the intention of the present process to cause or permit the resin prepolymer to cure after it has penetrated deep within the wood, the conditions of treating including the choice of resin prepolymer should be made so as to permit easy penetration of the wood followed by a rather rapid curing of the prepolymer after penetration. Although a variety of techniques including the use of latent catalysts might be used to accelerate the curing of the prepolymer, it has been discovered that one very convenient method of accelerating the curing of the prepolymer after the treating solution has deeply penetrated into the wood is to heat the treated wood. Although this heating can be accomplished in a variety of ways, the direct application of steam to the treated wood is preferred. This method requires no special chemicals and avoids the probems of premature curing that are sometimes associated with the use of catalysts. Moreover, the use of steam is convenient, economical, environmentally acceptable, and does not cause any clean-up problems.

The present process is likewise non-polluting and does not produce hazardous by-products. When the pre-polymer has cured in place, it serves to lock in the halogenated phenol and other optional ingredients, retard or prevent leaching or bleeding of the halogenated phenol and other optional ingredients (e.g. the organo-metallic compounds), and strengthens the wood. It is theorized that the pre-polymer reacts with hydroxyl groups present in the cellulosic chains of the wood. If so, this may account for why the treated wood becomes so resistant to microbiological deterioration and insect attack.

The present invention will be further understood by reference to the following Examples that include a preferred embodiment. Unless otherwise indicated, all parts and percentages are by weight.

Example 1

Ten parts of pentachlorophenol (commercial grade including the normal impurities) was mixed with 35 parts of methyl alcohol. Next, 20 parts by weight of an aqueous phenol formaldehyde prepolymer (Hooker resin 29765 having a molecular weight [weight average] of 141.9; a product of Hooker Chemical Company) is slowly added to the mixture. After the addition is completed, the liquid concentrate is further diluted with 35 parts of water.

EXAMPLE 2

The procedure of Example 1 is repeated. However, one part of a nonionic surfactant (Triton N-57, product of Rohm & Haas Company) is added to the mixture of methyl alcohol and pentachlorophenol prior to diluting that mixture with water.

EXAMPLE 3

The procedure of Example 2 is repeated with the further addition of one-half part of a 10 mole solution of borax to the completed mixture.

EXAMPLES 4–7

In Table 1 which follows are shown the approximate formulas for several treating compositions which may be made according to the present invention following the general procedure of Example 1.

TABLE 1

| Ingredient | Example 4 | Example 5 | Example 6 | Example 7 |
|---|---|---|---|---|
| (a) resin prepolymer solids[1] | 7.5 | 4.3 | 10 | 5 |
| (b) pentachlorophenol (commercial grade) | 5.5 | 6.6 | 3 | 2 |

TABLE 1-continued

| Ingredient | Example 4 | Example 5 | Example 6 | Example 7 |
|---|---|---|---|---|
| (c) methanol | 19.0 | 25.6 | 15 | 20 |
| (d) water | 68.0 | 61.8 | 71.7 | 67.5 |
| (e) surfactant[2] | — | 1.0 | 0.25 | 1.5 |
| (f) borax[3] | — | 0.7 | 0.025 | — |
| (g) copper-8-quinolinolate solids | — | — | — | 4 |

[1]From an aqueous phenol formaldehyde prepolymer having a solids content of 70% and a molecular weight (weight average) of 141.9; a product of Hooker Chemical Co.
[2]nonylphenoxypolyethoxy ethanol; Triton N-57, a product of Rohm & Haas.
[3]from a 25% solids solution; a product of Mooney Chemical Co.

EXAMPLE 8

Wood (Douglas fir) is treated with the treating composition of Example 4 by the following method.

The wood is a green Douglas Fir pole 10 inches in diameter. This wood is placed in a pressure treating vessel and the air is evacuated over a period of 20 minutes to a vacuum of 28 inches Hg. This reduced pressure is maintained for 30 minutes to permit water and volatiles in the wood to be removed. Next, the treating solution (Example 4 above) is pumped into the treating chamber so as to totally immerse or submerge the wood in the treating solution. The reduced pressure is maintained for an additional period of 90 minutes.

Thereafter, the pressure is allowed to increase to 25 psig and held for 40 minutes. The pressure is slowly released and the vacuum reapplied for 10 minutes. The pressure is then raised to 50 psig for 40 minutes. Then, the vacuum is applied for 10 minutes followed by pressure at 75 psig for 40 minutes. Then anoher cycle of vacuum for 10 minutes, followed by a pressure of 100 psig for 40 minutes. Then the vacuum is reapplied for 10 minutes followed by pressure at 150 psig for 8 hours. Then, the vacuum is reapplied for 10 minutes, followed by 240 psig pressure for 60 minutes. Then, a final vacuum cycle for 20 minutes. Then the pressure is returned to atmospheric pressure and the pressure treating vessel is drained.

After the treating solution is drained from the pressure treating vessel, but before removing the poles, steam at 15–50 psig is optionally added to the vessel for 15–30 minutes (depending on size). The purpose of the steam is to accelerate the curing of the resin prepolymer which has penetrated into the wood.

Then, the treated wood is removed from the pressure treating vessel.

What is claimed is:

1. A method of treating wood, by causing the deep penetration of the wood by a treating composition, which comprises:
   (a) placing the wood to be treated in an evacuation zone and exposing the wood to pressures below atmospheric pressure for a time sufficient to remove moisture and other volatiles from the wood;
   (b) immersing the wood in a water based treating composition consisting essentially of an effective amount of a halogenated phenol wood preservative, a sufficient amount of a phenolic resin prepolymer which upon curing will prevent preservative migration, and an amount of a coupling agent sufficient to substantially maintain the preservative and the prepolymer in solution;
   (c) maintaining the wood immersed in the treating composition under said reduced pressure until the solution has penetrated into the wood;
   (d) increasing the pressure above the liquid to a pressuure above atmospheric to thereby increase the penetration of the wood by said treating agent; and
   (e) recovering the treated wood.

2. Methods of claim 1 in which the treated wood is heated to accelerate the curing of the prepolymer.

3. Methods of claim 2 in which the heating is accomplished with steam.

4. Methods of claim 1 in which the halogenated phenol is penta-chloro phenol.

5. Methods of claim 4 in which the resin prepolymer is a phenol formaldehyde prepolymer.

6. Methods of claim 5 in which the weight ratio of halogenated phenol to resin prepolymer is from 3:1 to 1:15.

7. Methods of claim 6 in which the coupling agent comprises methyl alcohol.

8. Methods of claim 7 in which the treating agent consists essentially of:
   (a) penta chloro phenol;
   (b) phenol formaldehyde prepolymer, the weight ratio of penta chloro phenol to prepolymer being from 1:2 to 1:10;
   (c) methyl alcohol;
   (d) at least 50% by weight of water; and
   (e) from 0 to 5% by weight of at least one surfactant.

9. Methods of claim 8 in which the treating agent also contains copper-8-quinolinolate.

10. Methods of claim 8 in which the wood is green and in which steps "c" and "d" are repeated from 1 to 30 times.

11. Treated wood produced by the process of claim 1.
12. Treated wood produced by the process of claim 2.
13. Treated wood produced by the process of claim 3.
14. Treated wood produced by the process of claim 4.
15. Treated wood produced by the process of claim 5.
16. Treated wood produced by the process of claim 6.
17. Treated wood produced by the process of claim 7.
18. Treated wood produced by the process of claim 8.
19. Treated wood produced by the process of claim 9.

* * * * *